(12) United States Patent
Custinne et al.

(10) Patent No.: US 11,445,734 B2
(45) Date of Patent: Sep. 20, 2022

(54) CREAM COMPOSITIONS OPTIMIZED FOR FOAMING SYSTEMS

(71) Applicant: FrieslandCampina Nederland B.V., Amersfoort (NL)

(72) Inventors: Marc Jacques Christian Maurice Custinne, Wageningen (NL); Arno Fraiponts, Wageningen (NL)

(73) Assignee: FRIESLANDCAMPINA NEDERLAND B.V., Amersfoort (NL)

( * ) Notice: Subject to any disclaimer, the term of this patent is extended or adjusted under 35 U.S.C. 154(b) by 3 days.

(21) Appl. No.: 16/928,622

(22) Filed: Jul. 14, 2020

(65) Prior Publication Data

US 2020/0345027 A1    Nov. 5, 2020

Related U.S. Application Data

(63) Continuation of application No. PCT/EP2019/050603, filed on Jan. 11, 2019.

(30) Foreign Application Priority Data

Jan. 15, 2018 (EP) ..................... 18151711

(51) Int. Cl.
*A23C 13/14* (2006.01)

(52) U.S. Cl.
CPC .......... *A23C 13/14* (2013.01); *A23C 2210/30* (2013.01)

(58) Field of Classification Search
CPC ............................ A23C 13/14; A23C 2210/30

USPC ........................................................ 426/570
See application file for complete search history.

(56) References Cited

U.S. PATENT DOCUMENTS

2015/0104556 A1    4/2015   Kumar et al.

FOREIGN PATENT DOCUMENTS

| WO | WO-00/11973 A1 | 3/2000 | |
| WO | WO-2004/052114 A1 | 6/2004 | |
| WO | WO-2004052114 A1 * | 6/2004 | ............... A23L 9/22 |
| WO | WO-2005/006887 A1 | 1/2005 | |
| WO | WO-2005006887 A1 * | 1/2005 | ............... A23L 9/24 |
| WO | WO-2006/038807 A2 | 4/2006 | |
| WO | WO-2006038807 A2 * | 4/2006 | ........... A23C 9/1544 |
| WO | WO-2011/028117 A1 | 3/2011 | |

OTHER PUBLICATIONS

International Search Report received in corresponding International Application No. PCT/EP2019/050603, 3 pages.

* cited by examiner

*Primary Examiner* — Brent T O'Hern
(74) *Attorney, Agent, or Firm* — Sunit Talapatra; Foley & Lardner LLP

(57) ABSTRACT

The invention relates to a foamable or whippable food composition, in particular a cream, comprising at least 12 wt. % fat, protein, water, a citric acid ester of a mono- or diglyceride of one or more fatty acids comprising an unsaturated acyl chain and a lactic acid ester of a mono- or diglyceride of one or more fatty acids, the total content of substances other than water being at least 15 wt. % of the total weight of the composition.

22 Claims, No Drawings

CREAM COMPOSITIONS OPTIMIZED FOR FOAMING SYSTEMS

CROSS-REFERENCE TO RELATED APPLICATIONS

This application is a continuation of International Application No. PCT/EP2019/050603 filed Jan. 11, 2019, which claims the benefit of and priority to European Application No. 18151711.1 filed Jan. 15, 2018, both of which are hereby incorporated by reference herein in their entireties.

TECHNICAL FIELD OF THE INVENTION

The invention relates to a foamable or whippable food composition. Further, the invention relates to a method for preparing a foamable or whippable food composition. Furthermore, the invention relates to a foamed or whipped food composition and to a method of making such foamed or whipped food composition.

BACKGROUND OF THE INVENTION

Whipped or foamed food compositions containing fat (such as whipped or foamed cream) have various well known applications, e.g. as toppings on or fillings in desserts or baked products or as topping on a beverage, e.g. coffee or a cocoa drink. Relevant parameters for functional performance of such whipped or foamed products include overrun (the percentage of expansion of the volume of the product as a result of whipping or foaming), the ease of whippability/foamability, shelf-life stability, resistance to temperature variation, visual appearance, firmness, form retention, mouthfeel and taste.

Traditionally, cream is a dairy product composed of the fat layer skimmed from the top of milk before homogenization. However, alternatives to dairy cream have been developed which may be cheaper or have different properties, e.g. a different storage stability or heat resistance. Such alternatives include the use of non-dairy fats and the addition of non-dairy emulsifiers.

The foamable or whippable food compositions are generally fluid compositions that can be aerated by foaming or whipping, whereby gas bubbles are introduced into the fluid and entrapped in the fluid. Popular whipped or foamed food compositions are whipped cream and spray cream, based on dairy cream or a substitute for dairy cream.

Whipped cream is traditionally made by whipping with a whisk or hand-mixer. It can also be made using an electric mixer or food processor. Traditional whipped cream has a relatively low gas content, with an overrun of—typically—up to about 200%. Whipped cream is generally appreciated for its full-bodied flavour and mouthfeel, and a relatively high volume stability and firmness stability. Whipped cream may also be made in a whipping siphon, typically using nitrous oxide as the gas, as carbon dioxide tends to give a sour taste. Gas is dissolved in the unwhipped cream in the siphon under pressure, and when the pressure is released, the gas produces bubbles and thus whipped cream is formed.

A popular convenience product is the so-called spray cream. Spray creams are typically sold in aerosol spray cans, containing nitrous oxide as a propellant. Spray cream from such a spray can generally has a lower caloric value per volume than whipped cream, due to—typically—a higher overrun, usually of about 300% or more. On the other hand, firmness and form retention of known spray creams is generally not as good as for whipped cream. Also, mouthfeel of conventional spray creams is usually less appreciated by consumers. Accordingly, qualitatively, conventional spray creams are generally considered inferior to whipped cream, especially with respect to form retention.

The need for propellant gases, such as nitrous oxide or carbon dioxide is also a disadvantage, as these are greenhouse gases. Nitrous oxide is also suspected to be detrimental to the ozone layer. The use of carbon dioxide typically results in an unwanted acidic taste.

WO 2011/028117 relates to a method and system for dispensing a foamable or whippable product, which may be a food product or a non-food product, wherein the foamable or whippable product is discharged from a holder and outside that holder mixed with externally supplied gas, e.g. nitrous oxide, carbon dioxide or nitrogen. Thus, the gas and foamable composition are mixed shortly before its application as a foam. As mentioned above nitrous oxide and carbon dioxide are undesired. When applied to a foamable or whippable food composition, the present inventors found that foaming conventional compositions in such a type of device, results in a foam with a lower than desired overrun, firmness and/or form retention. In particular, they realized there is a need for improvement in the preparation of a foamed or whipped cream having a relatively high overrun, such as an overrun of about 270% or more. Further, there remains a need for improvements in mouthfeel and/or structure of fat-based foamed or whipped food products, in particular such food products that have been made using pressurization and depressurization of gas in the foamable or whippable food composition.

WO 2004/052114 discloses non-dairy creams that comprise a mixture of triglyceride compositions, having a large variety in fatty acid and triglyceride compositions contained in the mix, show improved stability and whipping performance. The composition further comprises an emulsifier that could be selected from a large variety of emulsifying compounds and combinations of two or more of such compounds.

WO 2005/006887 relates to a low fat whippable non-dairy cream (NDC), with a fat content from about 10 to about 25% (w/w), the NDC product comprising at least an oat base, and an emulsifier in an amount below 1.2% (w/w) based on the NDC product.

WO 00/11973 is concerned with a spray-dried emulsified topping base, comprising a fat component, a carbohydrate component, an emulsifier component and a soluble wheat protein. The fat component is present in an amount of at least 40% by weight of the spray dried product.

WO 2006/038807 relates to a fat-based cream having a fat content of between 10-20 wt. % and containing between 0.1 and 2.0 wt. % of a mono- and/or diglyceride containing at least one unsaturated fatty acid group.

US 2015/104556 relates to a spray dried cream base powder as dairy cream alternative, comprising 20-60 by wt. % fat, 1-5% by weight of one or more proteins, 0.5-5% by weight of one or more emulsifier system, 1-6% by weight of of native/modified starch, 1-5% by weight of water and the balance is made up of non-starchy carbohydrates, buffering agents and stabilizers.

SUMMARY OF THE INVENTION

It has now been found possible to provide a foamed or whipped food composition, in particular a foamed or whipped dairy-cream or dairy-substitute-cream with satisfactory properties, in particular also when foamed or whipped with a gas like nitrogen or air to generate a relatively high overrun, such as an overrun of about 270% or more, by including a specific combination of specific esters of a mono- or diglyceride.

Accordingly, the present invention relates to a foamable or whippable food composition, in particular a foamable or whippable, comprising at least 12 wt. % fat, protein, water, a citric acid ester of a mono- or diglyceride of one or more fatty acids comprising an unsaturated acyl chain and a lactic acid ester of a mono- or diglyceride of one or more fatty acids, the total content of substances other than water being at least 15 wt. % of the total weight of the composition.

Further, the invention relates to a method for preparing food composition according to the invention.

Further, the invention relates to a method for preparing a foamed or whipped food composition, comprising foaming or whipping a food composition according the invention.

Further, the invention relates to a foamed or whipped food composition, in particular a foamed or whipped cream, in particular a cream, comprising at least 12 wt. % fat, protein, water, a citric acid ester of a mono- or diglyceride comprising an unsaturated acyl chain and a lactic acid ester of a mono- or diglyceride, the total content of substances other than water being at least 15 wt. % of the total weight of the composition.

Further, the invention relates to a container, in particular a spray can, containing a foamable or whippable food composition according to the invention. Preferably a packaged foamable or sprayable composition of the invention is present in a bottle, a spray can (aerosol can) or a pouch. Particularly suitable is a container such as described in WO 2011/028117 or the Dutch national application filed 17 Nov. 2017 with application number NL2019935.

Further, the invention relates to a composite food product, containing a whipped or foamed food composition according to the invention and a further food component, in particular a further food component selected from the group of baked dough (e.g. cake, flan), drinks (e.g. coffee, cocoa-drink, fruit drink) and desserts (e.g. ice-cream, pudding, yoghurt).

DETAILED DESCRIPTION OF THE INVENTION

In accordance with the invention it has been found possible to provide a foamed or whipped food composition, making use of, e.g., air or nitrogen for whipping or foaming with a satisfactory firmness, form retention and mouthfeel, also at a high overrun. E.g. as illustrated in the examples, it has been found possible to provide a foamed or whipped cream having a overrun as high as 400% or more, with good firmness, a satisfactory form retention after 30 minutes from whipping/foaming, excellent mouthfeel and a desirable sharp and dry structure.

Although the present invention is particularly suitable to provide whipped/foamed creams with a very high overrun, it is also possible to make whipped/foamed creams with a moderately high overrun, such as in the range of 270-330%, having good firmness, a satisfactory form retention after 30 minutes, excellent mouthfeel and a desirable sharp and dry structure.

In particular, the addition of the unsaturated citric acid ester (E472c) has been found important to obtain a whipped/foamed cream with a high overrun in combination with a good mouthfeel and a desirable sharp and dry structure, whilst having a satisfactory firmness and form retention, compared to a foamable/whippable food composition comprising the same ingredients including a lactic acid ester (E472b), except that it does not contain the unsaturated citric acid ester. In particular, compared to a commercially available dairy cream composition without citric acid esters and without lactic acid esters advantages include high overrun, improved form retention.

A further advantage of a composition according to the invention is its suitability for being whipped/foamed to obtain a whipped/foamed product with satisfactory properties with a variety of whipping/foaming devices, also for a composition having a relatively low fat content, such as a fat content of about 20 wt. % or less.

A composition according to the invention has further been found advantageous in that it is well-whippable without phase-inversion occurring, also under relatively intense whipping conditions.

Unless defined otherwise, all technical and scientific terms used herein have the same meaning as commonly understood by one of ordinary skill in the art.

The term "or" as used herein means "and/or" unless specified otherwise.

The term "a" or "an" as used herein means "at least one" unless specified otherwise.

The term "substantial(ly)" or "essential(ly)" is generally used herein to indicate that it has the general character or function of that which is specified. When referring to a quantifiable feature, these terms are in particular used to indicate that it is for at least 75%, more in particular at least 90%, even more in particular at least 95%, even more in particular at least 99% of the maximum that feature.

The term 'essentially free' is generally used herein to indicate that a substance is not present (below the detection limit achievable with analytical technology as available on the effective filing date) or present in such a low amount that it does not significantly affect the property of the product that is essentially free of said substance. In practice, in quantitative terms, a product is usually considered essentially free of a substance, in particular water, if the content of the substance is 0-0.5 wt. %, in particular 0-0.2 wt. %, more in particular 0-0.1 wt. %, based on total weight of the product in which it is present. As will be understood by the skilled person, for certain substances, such as certain aromas or micronutrients, the presence in the starting material may be well below 0.5 wt. %, 0.2 wt. % or 0.1 wt. % and still have a significant effect on a property of the product.

The term "about" in relation to a value generally includes a range around that value as will be understood by the skilled person. In particular, the range is from at least 15% below to at least 15% above the value, more in particular from 10% below to 10% above the value, more specifically from 5% below to 5% above the value.

As used herein, percentages are usually weight percentages unless specified otherwise. Percentages are usually based on total weight, unless specified otherwise.

When referring to a "noun" (e.g. a compound, an additive etc.) in singular, the plural is meant to be included, unless specified otherwise.

For the purpose of clarity and a concise description features are described herein as part of the same or separate embodiments, however, it will be appreciated that the scope of the invention may include embodiments having combinations of all or some of the features described.

The term 'citrem' is used in the art as a generic name for 'citric acid esters of a mono- or diglyceride of one or more fatty acids'. Such citric acid ester comprising an unsaturated acyl chain is also referred to herein as an 'unsaturated citrem', whereas 'saturated citrem' refers to such citric acid wherein all acyl chains are saturated. The term 'lactem' is used in the art as a generic name for lactic acid esters of a mono- or diglyceride of one or more fatty acids.

The term 'fatty acid' is generally used herein as a genus for free fatty acids and fatty acid residues bound to another organic moiety, in particular as part of an acylglyceride.

The term 'fat' is used herein for triacylglycerides in general (irrespective of the melting point or range) and for lipid compositions substantially consisting of triglycerides in which a minor amount of one or more other lipid components (generally up to 5 wt. % in total) is present.

Milk fat is the fat phase of milk. Milk fat is a complex mixture of triglycerides and other lipid components. Milk fat typically consists for the largest part of triglycerides (e.g. about 98%).

In addition to triglycerides, milk fat typically contains several minor components, such as cholesterol, fat-soluble vitamins, free fatty acids, monoglycerides, diglycerides and various other organic components, such as lactones, ketones and aldehydes, contributing to the characteristic flavour or aroma of milk fat. Milk fat (isolated from milk) is commercially available, e.g. in essentially water-free from, which product is generally known as anhydrous milk fat (AMF).

The foamable or whippable food composition according to the invention is fluid at 25° C., and usually also at a temperature of about 4° C. It is typically a dispersion comprising an aqueous continuous phase and a dispersed fat phase. Thus, the foamable or whippable food composition may also be referred to as a dispersion or emulsion of the oil-in-water type.

In general, a foamable, foamed, whippable or whipped composition has an about neutral pH. Typically the apparent pH (the pH as determined by placing a calibrated pH electrode in the composition) is in the range of about 6.5 to about 7.0. In principle a composition according to the invention may be provided, of which the pH is outside said range. For instance, in a specific embodiment, the composition is a sour cream, which may have a pH as low as about 4.5. At too high or too low pH, protein may flocculate. For instance, at an acidic pH, typically below about pH 5, milk protein may flocculate. In order to avoid such undesired effect a stabilizer may be included, e.g. a pectin.

A foamed or whipped food composition according to the invention generally has essentially the same composition of substances as the foamable or whippable composition from which it is made, except for the presence of a gas phase (although the component forming the gas phase may be dissolved—under pressure—in the foamable or whippable composition, in particular for a spray cream application). In terms of its quantitative contribution to the weight of the composition the gaseous component/gas phase can generally be neglected. Thus, when referred herein to weight percentages of a component of a food composition according to the invention this generally applies to foamable, whippable, foamed and whipped compositions, unless specified otherwise.

The fat content of a food composition is at least 12 wt. %. At a lower fat content, firmness and/or volume stability is generally insufficient after whipping/foaming. By increasing fat content it is possible to increase volume stability and/or firmness, also at a relatively high overrun. On the other hand, the fat content contributes to an increased calorific value. Accordingly, the fat content is usually in the range of 15-45 wt. %, preferably in the range of 15-40 wt. %, more preferably in the range 18-35 wt. %, in particular in the range of 20-32 wt. % of the foamable, foamed, whippable or whipped food composition.

The fat is usually selected from the group consisting of milk fat, fractions of milk fat (e.g. obtained by dry fractionation or super critical fluid extraction) and vegetable fats, including fractions thereof. The vegetable fat may be any food-grade fat, in particular any food-grade vegetable fat known in the art to be suitable for use in whipped or foamed food composition. Suitable vegetable fats in particular include fat from palm (palm oil, palm kernel), coconut, rape seed, soy, canola, sunflower, shea, sheabutter. Usually, at least a substantial part of the fat is solid at 4° C. The fat can be fully or partially hardened or non-hardened, preferably fully hardened or non-hardened. Blends of fats from different sources can be used, e.g. a blend of milk fat or a fraction thereof and one or more vegetable fats, e.g. fractions thereof.

If milk fat is used, the milk fat content, based on total fat is usually at least 20 wt. %, preferably at least 50 wt. %. In particular good results have been achieved with a dairy cream. Accordingly, in a particularly preferred embodiment, the foamable, foamed, whippable or whipped food composition comprises 90-100 wt. % milk fat, based on total fat. As an alternative anhydrous milk fat or a fraction thereof can be used to provide the fat component of the foamable or whippable composition or at least a substantial part thereof.

In a specific embodiment, vegetable fat, which can be fractionated, is the major or only fat component. Thus in a specific embodiment, the vegetable fat content is 50-100 wt. %, more specifically 90-100 wt. % of the total fat content of a food composition according to the invention.

A food composition according to the invention comprises a protein. The presence of a protein is desired, in particular because it improves body and/or mouthfeel of the whipped/foamed composition. In principle the protein can be any food-grade protein, in particular any protein with emulsifying properties and/or gas-bubble stabilizing (such as foam stabilizing) properties. Particularly good results have been achieved with a milk protein. Milk proteins are proteins found in or derived from mammalian milk, such as caseins, caseinates and whey proteins. The milk protein content is accordingly preferably 50-100 wt. %, in particular 90-100 wt. % of the protein content.

Whey protein or casein/caseinate can be included in an at least substantially pure form.

Whey protein isolate and whey protein concentrate are suitable examples of whey protein in an at least substantially pure form. Beta serum protein is an example of a specific whey protein fraction that can be provided in at least substantially pure form.

Micellar casein isolate and casein concentrate are suitable examples of caseins protein in an at least substantially pure form.

It is also possible to provide casein and whey protein as a mixture, e.g. as milk, milk protein concentrate or milk powder, in particular skim milk or skim milk powder or as buttermilk or buttermilk powder, in particular sweet butter milk or sweet butter milk powder.

Casein sources, whey protein sources and mixtures providing both casein and whey protein can also be a source of one or more other food ingredients, such as minerals and lactose.

In the case of butter milk, whole milk or semi-skimmed milk or dried forms thereof—fats and other substances with emulsifying properties, such as lecithins and phospholipids are usually present.

In particular, good results have been achieved with a whippable or foamable food composition comprising casein and whey protein in a weight to weight ratio of casein to whey protein in the range of 70:30 to 90:10, in particular in the range of 78:22 to 88:12.

Generally, the protein content, in particular the milk protein content, is 0.5-6 wt. %, preferably 0.7-5 wt. %, more preferably 0.8-4 wt. %.

Good results with respect to properties of the whipped/foamed product (high overrun, good form retention, good firmness) have been achieved over a broad concentration range for the citric acid ester of a mono- or diglyceride of one or more fatty acids comprising an unsaturated acyl chain, both at a relatively low fat content and a relatively high fat content. The total content of citric acid esters of a mono- or diglyceride comprising an unsaturated acyl chain is generally in the range of 0.05-0.5 wt. %, preferably in the range of 0.08-0.40 wt. %, more preferably in the range of 0.10-0.30 wt. %. A relatively low concentration, such as a concentration of 0.25 wt. % or less, in particular of about 0.20 wt. % or less, more in particular about 0.15 wt. % or less has been found suitable to provide a whipped or foamed product with satisfactory properties like form retention and firmness, also at a relatively high overrun (e.g. of 270-330% or higher), and with a reduced risk of developing an off-taste, compared to e.g. a product with a relatively high citric acid ester content.

The citric acid ester can in principle be selected from any citric acid ester of a mono- or diglyceride, classified as an allowed food additive according to EU regulations (E-number: E472c), having an unsaturated acyl chain. Good results have been achieved with a citric acid ester made from a sunflower oil. Usually, the iodine value of the citric acid ester is in the range of 25-125, preferably in the range of 45-85, in particular about 65. The iodine value is as determinable by AOCS Cd 1-25 (with the proviso that carbon tetrachloride is replaced by chloroform).

In an embodiment, the acid value of the citric acid ester of a mono- or diglyceride in the composition is in the range of 20-40 (determinable according to JECFA Monograph, Vol. 4, p. 161) and/or the saponification value is in the range of 245-275 (FCC, 9th ed., p. 372).

The total content of lactic acid esters of a mono- or diglyceride is generally in the range of 0.2-1.5 wt. %, preferably in the range of 0.5-1.5 wt. %, more preferably in the range of 0.7-1.1 wt. %.

The lactic acid ester can in principle be selected from any lactic acid ester of a mono- or diglyceride, classified as an allowed food additive according to EU regulations (E-number: E472b). The lactic acid ester has in particular been found to have a positive effect on the overrun. The concentration of the lactic acid ester can thus be increased if a higher overrun is desired. On the other hand, it has been found that an increase in lactic acid ester, may result in a reduced firmness of the foamed or whipped composition. Since the citric acid ester of the mono- or diglyceride comprising an unsaturated acyl chain has been found suitable to improve firmness, it may be desired to increase the concentration of this component as well if the lactic acid ester concentration is increased. In particular for a composition that should be suitable to be whipped or foamed to an overrun of at least 270%, and for a whipped or foamed composition with an overrun of at least 270%, the weight to weight ratio total citric acid ester of a mono- or diglyceride of one or more fatty acids comprising an unsaturated acyl chain to lactic acid ester of a mono- or diglyceride of one or more fatty acids usually is at least about 2, preferably in the range of 2-6, in particular about 3 to about 4. A higher portion of the lactic acid ester is in particular desired to increase the overrun, a higher portion of said citric acid ester is in particular desired to increase the firmness of the whipped/foamed composition.

In particular, good results have been achieved with a composition comprising a lactic acid ester of a monoglyceride comprising one saturated acyl chain and/or a lactic acid ester of a diglyceride comprising two saturated acyl chain. The iodine value of the lactic acid ester of a mono- or diglyceride, as determinable by AOCS Cd 1-25 (with the proviso that carbon tetrachloride is replaced by chloroform), is therefore preferably less than 10, in particular about 3 or less. Preferably a lactic acid ester of a mono- or diglyceride is present comprising a saturated C16-C18 acyl chain. In a particularly preferred embodiment, glycerol lactopalmitate is the sole lactic acid ester or the major lactic acid ester (>50 wt. % of the total content of lactic acid ester) in a composition according to the invention.

In an embodiment, the composition according to the invention further comprising a further emulsifier, other than the citric acid ester of a mono- or diglyceride of one or more fatty acids comprising an unsaturated acyl chain and the lactic acid ester of a mono- or diglyceride of one or more fatty acids. Such further emulsifier preferably is a mono- or diglyceride of saturated fatty acids. If present, the total concentration of said further emulsifier usually is at least 0.01 wt. %, preferably at least 0.05 wt. %. The emulsifier can be any such emulsifier allowed for used in food according to EU-regulations (E-number: E471). Examples of suitable further emulsifiers are known to contribute to emulsion stability prior to foaming/whipping. However, use of such emulsifiers without the citric acid ester of a mono- or diglyceride of one or more fatty acids comprising an unsaturated acyl chain and the lactic acid ester of the mono- or diglyceride typically results in a relatively low overrun. The presence of such further emulsifier is not needed to obtain a product according to the invention with a high overrun (e.g. of more than 300%). At a high concentration of the further emulsifier the foamed/whipped creamed can become overly fluffy. Accordingly, the total concentration of said further emulsifiers is usually less than 0.5 wt. %, preferably 0.4 wt. % or less, in particular 0.3 wt. % or less.

The particle size distribution of the composition of the invention is characterized by one or more of the following parameters, as determinable with laser diffraction:
a Dv(10) between 0.1-0.3 μm
a Dv(50) between 0.6-0.8 μm
a Dv(90) between 1.5-3.0 μm.

It has been found that such a particle size distribution contributes to a high overrun during whipping or foaming. For comparison, if the fat is milk fat, the starting cream (obtained by skimming of raw milk) used to produce the composition of the invention is characterised, on average, by a Dv(10) of 2.3 μm, a Dv(50) of 6.8 μm, and a Dv(90) of 6.5 μm, which is a too large distribution.

Dv(10) is the diameter at which 10% of the mass that is characterized is comprised of particles with a diameter less than this value.

Dv(50) is the diameter of the particle that 50% of the mass that is characterized is smaller than and 50% of a sample's mass is larger than.

Dv(90) is the diameter at which 90% of the mass that is characterized is comprised of particles with a diameter less than this value.

Particle size determinations by laser diffraction can be carried using f.i. a Mastersizer® 2000, provided by Malvern Instruments, UK. The skilled person is aware how to execute such standard measurements.

Further details on particle characterization can be found, e.g., in the white paper "A basic guide to particle characterization", from Malvern Instruments Limited © 2015, available on internet via https://www.cif.iastate.edu/sites/default/files/uploads/Other_Inst/Particle%20Size/Particle%20Characterization%20Guide.pdf.

A food composition according to the invention can further comprise a stabilizer, such as a stabilising polysaccharide. Particularly suitable is a stabilising gum, such as a stabilising carrageenan gum, locust bean gum, xanthan gum or guar gum. A further suitable class of stabilizing polysaccharides is formed by the stabilizing an anionic polysaccharides, such as alginates. Such stabilizers are known in the art, and can be used to obtain a foamed or whipped product, in particular a spray cream with a prolonged foamed/whipped product volume stability. If present, the stabilizing polysaccharide content is usually in the range of 0.001-5-wt % preferably 0.005-4 wt. %. The skilled person will be able to determine a particularly suitable concentration dependent on the specific polysaccharide or polysaccharides used, on the basis of common general knowledge and the information provided herein. However, it has been found possible to obtain a whipped or foamed food composition with a high overrun (of 270% or more), e.g. a spray cream, without needing a stabilizer. It has also been observed that the composition according to the invention does not need any further gelling agents such as gelatin. Therefore, in a preferred embodiment, the composition does not contain gelatin.

The invention relates to sweetened food compositions as well as non-sweetened compositions. Thus a food composition according to the invention can be essentially free of sugar and/or other added components providing sweetness, such as maltodextrins and high intensity sweeteners. In an embodiment, the food composition comprises sugar (mono- or disaccharides, such as sucrose, glucose, fructose) and/or larger saccharides providing sweetness, e.g. maltodextrins. If present, the saccharide content, in particular the total content of sugars and/or maltodextrins, is usually in the range of 2-20 wt. %, in particular 4-10 wt. %. The total content of saccharides+fat is generally about 50 wt. % or less, preferably 45 wt. % or less, more preferably 40 wt. % or less, in particular 35 wt. % or less, more in particular 32 wt. % or less.

Further, the food composition may comprise one or more further ingredients that are known to be suitable to include in whipped, foamed, whippable or foamable food compositions. Examples thereof include colourants and flavors. These can be included in a usual concentration.

In an embodiment, the food composition according to the invention comprises a savoury tastant, such as a cheese powder, preferably an Emmenthal-, Gouda- or Cheddar cheese powder; or a cream cheese powder. These cheese powders may be present in an amount of 1.5-5% (wt/wt).

The composition may further comprise salt, preferably NaCl, in an amount of 0.5-1.5% (wt/wt).

Savoury whippable/foamable food compositions may be used in the preparation of "cheese tea", a beverage which is highly appreciated in a.o. China. The cheese tea is prepared by whipping the composition of the invention to a certain overrun and layering it on top of the tea.

Hence, the invention also relates to the use of the food composition according to the invention in the preparation of cheese tea.

The total dry substance content (components other than water) is at least 15 wt. %. Thus, the water content is 85 wt. % or less, preferably 75 wt. % or less, in particular 65 wt. % or less, more in particular about 60 wt. % or less.

Generally, the water content is about 50 wt. % or more, preferably about 55 wt. % or more, more preferably about 60 wt. % or more. Insufficient water may cause phase inversion whereby water becomes dispersed in the fat phase.

The foamable or whippable food composition can be produced using methodology known per se, e.g. for the production of whippable or foamable creams, in particular dairy creams or vegetable-fat based whippable or foamable creams.

In an advantageous embodiment, the preparation of the foamable or whippable food composition comprises forming a pre-emulsion of the oil-in-water type comprising the protein, such as skimmed milk or sweet buttermilk, the citric acid ester of a mono- or diglyceride of one or more fatty acids comprising an unsaturated acyl chain and a lactic acid ester of a mono- or diglyceride of one or more fatty acids, the lactic acid ester of a mono- or diglyceride and the fat component; and subjecting the pre-emulsion to a homogenization step, whereby the foamable or whippable composition is formed.

In a specific embodiment the method for preparing the foamable or whippable composition comprises
a) dispersing the citric acid ester of a mono- or diglyceride of one or more fatty acids comprising an unsaturated acyl chain and a lactic acid ester of a mono- or diglyceride of one or more fatty acids, the lactic acid ester of a mono- or diglyceride and—if desired other ingredients except for the fat component, such as a further emulsifier and/or a digestible carbohydrate, in said aqueous solution or dispersion, thereby obtaining an aqueous emulsifying blend;
b) mixing the aqueous emulsifying blend with a component providing the fat, preferably cream, and forming a pre-emulsion of the oil-in-water type from said blend and said component providing the fat;
c) subjecting the pre-emulsion to an antimicrobial heat treatment, e.g. UHT or pasteurization; and thereafter
d) subjecting the heat-treated pre-emulsion to a homogenization step, whereby the foamable or whippable/whippable composition is formed, and wherein the protein is present in step a) and/or step b).

In an advantageous embodiment, the antimicrobial heat treatment comprises a direct steam injection (DSI). This has been found particularly advantageous for an application wherein the foamable or whippable food composition is for the preparation of a food composition with a high overrun, such as a spray cream or the like, because heat treatment by DSI of the foamable/whippable food composition has been found to have a positive effect on overrun generation during whipping/foaming. As already mentioned above, the invention further relates to a foamed or whipped food composition, in particular a cream, comprising at least 12 wt. % fat, water, protein, a citric acid ester of a mono- or diglyceride comprising an unsaturated acyl chain and a lactic acid ester of a mono- or diglyceride.

In principle such composition can be a composition having a relatively low overrun, which has an overrun of 100% or less, like e.g. a rich, heavy cream with 50-100% overrun. However, the invention has been found particularly advantageous for foamed or whipped composition with an overrun of more than 100%. Thus, usually the foamed or whipped composition has an overrun of about 150 wt. % or more. Preferably the overrun is at least 250%, more preferably at least 270 wt. %. The upper limit is mainly determined by its intended application, and may be up to 300%, advantageously about 330% or more, 400% or more, 450 wt. % or more, in particular up to about 500%.

Good results have also been achieved with a product having an overrun of about 270-330%, in particular with a cream or cream-substitute that has been whipped or foamed with a whipping machine, e.g. a Sanomat™ or a continuous whipper, e.g. a Trefa™ or Mondomix™ or the like.

In particular for a spray-cream or spray-cream substitute, it has been found possible to provide a whipped/foamed product with good stability, taste olfactory characteristics and an overrun of more than 300%, such as. 360-470 wt. %.

In an advantageous embodiment the foamed or whipped food composition, e.g. a spray cream or spray cream substitute has a firmness of 60-200 g, in particular of 80-120 g, as determined by the method described in the Examples.

In an advantageous embodiment the foamed or whipped food composition, e.g. a spray cream or spray cream substitute, has a form retention after 30 min (i.e. the difference between firmness directly after whipping/foaming band firmness after 30 min. times 100%) of at least 60% in particular of 65-95%, more in particular of 70-90%, as determined by the method described in the Examples.

The foamed or whipped food composition can be obtained by foaming or whipping a foamable or whippable composition according to the invention. For this, methodology known per se can be used, e.g. whipping, with a whisk or hand-mixer. It can also be made using an electric mixer or food processor or a whipping siphon.

In an advantageous embodiment, the foamed or whipped food composition is obtained using a portable apparatus (1) for dispensing a product (the food composition), including:
  a product container (5) which contains the product (P) that is to be foamed by and dispensed from the apparatus;
  a gas container (7), at least containing a gas, for example a single gas or a gas mixture, wherein the gas substantially does not contain any greenhouse gases such as $N_2O$;
  a dispersion device (10), having a product entrance that is connectable to the product container (5) for receiving product (P), the dispersion device (10) further being connectable to the gas container (7) for supplying the gas to the product (P) during product discharge;
  a processing device (12) downstream of the dispersion device (10) for performing a mixing treatment and/or pressure reduction on the product provided with the gas; and
  a product dispensing head (20), being part of a top section (19) of the apparatus (1) and being arranged downstream of the processing device (12), the dispensing head (20) defining a product receiving space (21) to receive the product (P) from the processing device (12), a distal part of the dispensing head (20) preferably having product shaping projections (22),
  wherein the apparatus (1) is configured to be used at least in a substantially upside-down orientation during product discharge.

Details of such apparatus can be found in NL2019935.

In principle, a foamable or whippable composition according to the invention can be provided with any gas suitable for use in a food application. Preferably, the gas phase of the foamed or whipped composition at least substantially consists of nitrogen or air or mixtures thereof. With these gases a foamed or whipped food composition is obtained that has favourable properties, whilst they do not contribute to negative environmental effects, like—e.g.—greenhouse gasses, such as nitrous oxide or carbon dioxide, do.

When preparing the foamed or whipped food composition as disclosed hereabove, the presence of a gelling agent such as gelatin is not necessary and should preferably be avoided, as it will cause the composition to be too firm for use in a whipping or foaming operation. Therefore, in a method according to the invention for preparing a foamed or whipped food composition, preferably no gelatin is used.

In an embodiment, the food composition is whipped cream, in particular whipped dairy cream.

In an embodiment, the food composition is spray cream, preferably dairy spray cream.

In an embodiment, the whipped or foamed food composition is a dessert.

In an embodiment, the whipped or foamed food composition is a topping or used as a part of a food or beverage product, e.g. as a filling for a bakery product, or as a topping for a bakery product, a dessert or a drink, e.g. a coffee-drink or chocolate-drink.

In an embodiment, the composition is a gas-foamable composition, and is provided in a container, such as a spray can, having a holding space for holding a food composition, said space containing a gas-foamable or whippable food composition according to the invention and which space is essentially free of a propellant gas other than nitrogen or air.

The invention will now be illustrated by the following examples.

EXAMPLES

Determination of Overrun:

The overrun is the volume increase in terms of volume of whipped or foamed composition (cream) vis-à-vis liquid composition (cream).

The overrun is determined by the relation between the density of the liquid and the density of the whipped/foamed composition. To measure the overrun, a recipient (cup) of 205 ml is filled with whipped/foamed composition. The composition is levelled with the upper rim of the recipient and the weight of the contents of the recipient is determined.

A larger quantity of air in the whipped/foamed composition will lead to a lower density and thus a lower weight.

$$\text{Overrun}=((V\times\text{density/weight})-1)\times 100\%$$

Where: V=volume of the recipient (205 ml)
density=density of liquid composition (g/ml)
weight=weight of the whipped/foamed composition in the recipient (g)

E.g.: a weight of 95 g of whipped cream in a recipient of 205 ml and liquid cream with a density of =0.995 g/ml→ $((205\times 0.995/95)-1)\times 100 = 115\%$ Determination of Firmness:

The firmness is measured using a Texture Analyser (Stable Micro Systems TA-XT Plus). This device inserts a cylinder (Perspex, 25 mm diameter and 40 mm height) with a constant speed (1 mm/s) and distance (20 mm) into the product (whipped/foamed composition). The maximal force the machine must use to penetrate into the product measures the firmness of the product. The firmness of the whipped or foamed product is expressed in grams. The higher the value, the firmer the whipped or foamed product.

Form retention is the firmness of the whipped or foamed composition which is measured after a certain time at a certain temperature. In the examples, unless specified otherwise the form retention was determined after 30 minutes at 4° C. Form retention may also be expressed as a percentage of remaining firmness compared to the firmness directly after whipping or foaming.

Specific Parameters to Judge the Quality of a Whipped Cream (Visual Blob)

Taste panel judgement criteria for the visual and sensory parameters of whipped creams are as follows:

Angle of the edges:

sharp edge: associated with a firm whipped cream which remains standing

Blunt(soft) edge: associated with a weak, melted whipped cream

Scale: 0-10

0 is very weak 10 is very sharp

Shine Visual Aspect:

Dry aspect: associated with matt and firm whipped cream

Glossy aspect: associated with watery texture

Scale: 0-10

0 is very glossy 10 is very dry

Example 1: Preparation of a Foamable or Whippable Dairy Cream

The following ingredients were used:

71.4 wt. % dairy cream (from cow milk) having 42 wt. % fat content.

17.5 wt. % skimmed cow milk 10 wt. % sugar (sucrose)

0.7 wt. % glycerol lactopalmitate (Admul GLP 2033™ from KERRY (E472b))

0.15 wt. % citric acid ester of mono-diglyceride made from edible refined sunflower oil (GRINDSTED® citrem LR10 from Dupont, having an acid value of 20-40, a saponification value of 245-275 and a iodine value of about 65 (E472c).

0.2 wt. % further emulsifier, a mono-diglyceride of fatty acids comprising a saturated acyl chain (E471).

0.008 wt. % carrageenan (stabilizer, to prevent creaming up during-shelf-life)

The foamable or whippable dairy cream was made as follows

Pre-Emulsion:

stabilizers, E471, E472b and E472c were dispersed in skimmed milk under heavy agitation with a Silverson mixer; thereafter sugar was added, thereafter the resultant blend was mixed with the cream, to form a pre-emulsion.

The pre-emulsion was homogenized (T=65° C., pressure 15/7 bars) followed by a pasteurization at 79° C. for 22 sec and cooled to 5° C. The pre-emulsion is stored at a temperature at 5° C.

Thereafter, the homogenized pre-emulsion was UHT treated by direct steam injection (143° C./4 sec) followed by a further homogenization (45/10 bars at 75° C.). Next, the resultant emulsion was cooled (directly to 4 or "slow cooled" to 18° C. and then to 4° C.) and the resultant whippable or foamable composition was filled into a container.

Example 2

With reference to Example 1, several foamable/whippable cream compositions (30 wt. % fat) were made as follows: emulsifiers were melted; next emulsifiers, stabilizers and sugar were mixed in skim milk, while mixing with a Silverson mixer and thereafter the resultant mixture was poured in dairy cream. Next, the resultant cream mixture was pasteurized (80° C., 20 min) and homogenized at 15 bars. Next, the cream mixture was cooled to 4° C. after which the cream mixture was sterilized (143° C., 6 sec) and subsequently homogenized at 75/10 bars (2 stages), followed by cooling to 20° C. Compositions 1-3, 8 and 9 are according to the invention, compositions 4-7 are reference products. Further, a conventional spray cream (30% fat in aerosol), marked as composition 10, and a conventional UHT liquid cream (30% fat, containing carrageenan), marked as composition 11, were formulated.

Compositions 1-9 and 11 were foamed with a system shown in Example/Figure of Dutch national application filed 17 Nov. 2017 with application number NL2019935. Composition 10 was not foamable with this system (fluffy), so it was foamed with an aerosol instead.

The compositions (all components in wt. %) and results are shown in the following tables.

Composition of the Tested Compositions

| Composition No: | 1 | 2 | 3 | 4 | 5 | 6 | 7 | 8 | 9 | 10 | 11 |
| --- | --- | --- | --- | --- | --- | --- | --- | --- | --- | --- | --- |
| Cream 42% fat | 71.43 | 71.43 | 71.43 | 71.43 | 71.43 | 71.43 | 71.43 | 71.43 | 71.43 | 71.43 | 71.43 |
| Skim milk | 17.71 | 17.31 | 17.96 | 17.66 | 18.36 | 18.21 | 17.51 | 17.61 | 17.36 | 18.31 | 18.56 |
| Sugar | 10.00 | 10.00 | 10.00 | 10.00 | 10.00 | 10.00 | 10.00 | 10.00 | 10.00 | 10.00 | 10.00 |
| E 407 (carageenan) | 0.01 | 0.01 | 0.01 | 0.01 | 0.01 | 0.01 | 0.01 | 0.01 | 0.01 | 0.01 | 0.01 |
| E472b (Lactem) | 0.70 | 0.70 | 0.35 | 0.70 | 0.00 | 0.00 | 0.70 | 0.70 | 0.70 | 0.00 | 0.00 |
| E471(mono-diglycerides of fatty acids) | 0.00 | 0.40 | 0.10 | 0.20 | 0.20 | 0.20 | 0.20 | 0.20 | 0.20 | 0.25 | 0.00 |
| E472c (citrem - unsaturated) | 0.15 | 0.15 | 0.15 | 0.00 | 0.00 | 0.15 | 0.00 | 0.05 | 0.30 | 0.00 | 0.00 |
| E472c (citrem - saturated) | 0.00 | 0.00 | 0.00 | 0.00 | 0.00 | 0.00 | 0.15 | 0.00 | 0.00 | 0.00 | 0.00 |
| | 100.00 | 100.00 | 100.00 | 100.00 | 100.00 | 100.00 | 100.00 | 100.00 | 100.00 | 100.00 | 100.00 |

Source E472c unsaturated: Grindsted ® Citrem N 12 VEG SG, Danisco.

Results

| Composition No: | 1 | 2 | 3 | 4 | 5 | 6 | 7 | 8 | 9 | 10* | 11 |
|---|---|---|---|---|---|---|---|---|---|---|---|
| Overrun (%) | 402 | 443 | 344 | 353 | 78 | 220 | 371 | 385 | 426 | 400 | 120 |
| Firmness direct (gf) | 104 | 104 | 111 | 83 | 19 | 83 | 87 | 101 | 114 | 90 | 70 |
| Visual texture direct after whipping: | | | | | | | | | | | |
| Angle of the edges | 8 | 7 | 9 | 3 | 0 | 2 | 3 | 7 | 9 | 8 | 6 |
| Shine | 8 | 6 | 8 | 2 | 0 | 1 | 3 | 7 | 9 | 6 | 6 |
| Firmness after 30 minutes at 4° c. (gf) | 73 | 70 | 78 | 70 | 5 | 53 | 76 | 68 | 73 | 20 | 45 |
| Visual texture after 30 minutes: | | | | | | | | | | | |
| Angle of the edges | 7 | 6 | 7 | 0 | 0 | 0 | 2 | 5 | 8 | 0 | 4 |
| Shine | 6 | 5 | 7 | 0 | 0 | 0 | 1 | 6 | 7 | 0 | 3 |

*aerosol-foamed

The results show that the reference products 4-7 had unacceptable visual texture: very glossy, fluffy with a melted and watery association, whereas the compositions according to the invention showed a desirable dry and sharp texture. Initial firmness, firmness stability (form retention) and overrun for the compositions according to the invention remained satisfactory or was improved in one or both aspects. An improvement in form retention is also noticeably, e.g., compared to the conventional spray cream composition 10 (30% fat dairy cream). Compositions according to the invention also outperformed compositions 10 and 11, e.g., with respect to visual appearance, especially after 30 min.

Example 3

Composition 3 of Example 2 was whipped with a Sanomat and the results were compared with compositions 10 and 11 of Example The composition 10 was not whippable. Overrun of the whipped composition 3 was twice as high as the whipped composition 11 (300% vs. 150%), firmness was satisfactory (80 g, vs. 120 g for composition 11).

Difference in visual appearance of the whipped composition 3 compared to composition 11 was similar as for the respective compositions whipped according to Example 2.

Example 4

Composition 3 of Example 2 was whipped with a Trefa continuous whipper and the results were compared with compositions 11 (composition 10 was not whippable on the Trefa)

Results Continuous Whipper Trefa

| Composition: | 3 | 11 |
|---|---|---|
| Overrun (%) | 420 | 250 |
| Firmness direct (gf) | 99 | 130 |
| Firmness after 30 minutes at 4° C. (gf) | 76 | 100 |

Difference in visual appearance of the whipped composition 3 compared to composition 11 was similar as for the respective compositions whipped according to Example 2.

Example 5

Composition according to the invention comprising 20% fat (no 12) respectively 15% fat (no 13) were prepared, in a manner as described in detail in Example 2. They were whipped/foamed with various whipping devices and compared with two conventional cream compositions comprising 20% fat. Reference spray can composition 14, comparable to composition 10, was not whippable with the used foaming system of NL2019935. It was foamed as aerosol instead.

The recipes were as follows.

Recipe:

| Composition No: | 12 | 13 | 14 (ref) | 15 (ref) |
|---|---|---|---|---|
| Cream 42% fat | 47.62 | 35.71 | 47.62 | 47.62 |
| Skim milk | 41.116 | 52.876 | 42.16 | 42.26 |
| Sugar | 10 | 10 | 10 | 10 |
| E 407 (carageenan) | 0.014 | 0.014 | 0.02 | 0.02 |
| E472b (Lactem) | 0.9 | 0.9 | 0 | 0 |
| E471 (mono-diglycerides of fatty acids) | 0.2 | 0.2 | 0.2 | 0.1 |
| E472c (citrem - unsaturated) | 0.15 | 0.3 | 0 | 0 |
| | 100.000 | 100.000 | 100.000 | 100.000 |

Results Foaming/Whipping System of NL2019935

| Composition No: | 12 | 13 | 14* | 15 |
|---|---|---|---|---|
| Overrun (%) | 405 | 391 | 400 | — |
| Firmness direct (gf) | 85 | 76 | 70 | — |
| Visual texture direct after whipping: | | | | |
| Angle of the edges | 7 | 9 | 5 | |
| Shine | 7 | 8 | 7 | |
| Firmness after 30 minutes at 4° C. (gf) | 60 | 58 | 10 | |
| Visual texture direct after whipping: | | | | |
| Angle of the edges | 6 | 7 | 0 | |
| Shine | 5 | 5 | 0 | |

*aerosol-foamed

Results Foaming/Whipping System of NL2019935

| Composition No: | 12 | 13 | 14* | 15 |
|---|---|---|---|---|
| Visual texture direct after whipping: | | | | |
| Angle of the edges | 7 | 9 | 5 | |
| Shine | 7 | 8 | 7 | |
| Firmness after 30 minutes at 4° c. (gf) | 60 | 58 | 10 | |
| Visual texture direct after whipping: | | | | |
| Angle of the edges | 6 | 7 | 0 | |
| Shine | 5 | 5 | 0 | |

*aerosol foamed

Results Whipping Machine Sanomat

| Composition No: | 12 | 13 | 14 (ref) | 15 (ref) |
|---|---|---|---|---|
| Overrun (%) | 362 | 405 | | not whippable (fluffy) |
| Firmness direct (gf) | 84 | 46 | | |
| Visual texture direct after whipping: | | | | |
| Angle of the edges | 7 | 8 | | |
| Shine | 7 | 8 | | |

Results Continuous Whipper Trefa

| Composition No: | 12 | 13 | 14 (ref) | 15 (ref) |
|---|---|---|---|---|
| Overrun (%) | 390 | | | not whippable (fluffy) |
| Firmness direct (gf) | 70 | | | |
| Visual texture direct after whipping: | | | | |
| Angle of the edges | 7 | | | |
| Shine | 7 | | | |

The compositions according to the invention can adequately be used on various whipping devices, also at a low fat content, whereas the conventional compositions were found to be not whippable of leading to poor results.

It is in particular surprising that such a high overrun, good texture and good visual appearance is achieved with a low-fat composition on a continuous whipping machine.

Example 6

Foamable/whippable compositions having a total fat content of 32 wt. %, comprising vegetable fat (either 100% of the fat or 50% vegetable fat and 50% milk fat, based on total fat) were prepared as follows.

The emulsifiers and vegetable fat were melted at 60° C. The emulsifiers, melted fat, stabilizers, butter milk powder and sugar were mixed in warm skim milk (60° C.) while mixing with a Silverson mixer. For the preparation of the composition comprising 50/50 vegetable fat and milk fat, thereafter warm cream (60° C.) was added to the mixture, while continuing to mix in the Silverson mixer.

The resultant compositions were pasteurized (80° C.-20 min), then homogenized at 20/10 bars (2 stages), and thereafter sterilized at 143° C. for 6 min (infusion). The sterilized compositions were cooled to 4° C.

Recipe

| Composition No: | 16 | 17 |
|---|---|---|
| Cream 42% | 38.1 | 0 |
| Skim milk | 33.44 | 64.44 |
| Vegetable fats blend of fully hydrogenated palmkernel fat (40%), palmkernel fat (50%) and rapeseed oil (10%) | 16 | 32 |
| Buttermilk powder | 1.3 | 2.4 |
| Sugar | 10 | 0 |
| E 407 (carageenan) | 0.01 | 0.01 |
| E472b (Lactem) | 0.7 | 0.7 |
| E471(mono-diglycerides of fatty acids) | 0.3 | 0.3 |
| E472c (citrem - unsaturated) | 0.15 | 0.15 |
| | 100.000 | 100.000 |

Recipe

| Composition No: | 16 | 17 |
|---|---|---|
| E472b (Lactem) | 0.7 | 0.7 |
| E471(mono-cliglycerides of fatty acids) | 0.3 | 0.3 |
| E472c (citrem - unsaturated) | 0.15 | 0.15 |
| | 100.000 | 100.000 |

Results with Foaming/Whipping System of NL2019935

| Composition No: | 16 | 17 |
|---|---|---|
| Overrun (%) | 414 | 419 |
| Firmness direct (gf) | 100 | 105 |
| Visual texture direct after whipping: | | |
| Angle of the edges | 9 | 10 |
| Shine | 9 | 10 |

Example 7. Preparation of a Savoury Cream for Use on Cheese Tea

The composition is described in the table below:

| Ingredient | | Amounts in cream (% wt/wt) |
|---|---|---|
| Dairy Cream (43% fat) | | 60.9 |
| Water | | 26.8 |
| Sugar | | 8 |
| Stabilizer | Carragheenan E 407 (Lactarin) | 0.008 |
| Emulsier Mono/diglycerides (E471) | Dimodan RT | 0.4 |
| Emulsifier Lactem(E472b) | Admul GLP 2033 | 0.45 |
| Emulsifier Citrem (E472c) * | Grindsted LR10 | 0.15 |
| Salt | | 0.8 |
| Cheese powder | | 2.5 |

* unsaturated type

The process was the following:
Stabilizer, E471, E472b and E472c and cheese powder are dispersed in cold water under heavy agitation (e.g. Silverson mixer).
Thereafter this blend is gently mixed with a cold mixture of the cream and the sugar.
This final liquid mixture is UHT treated by direct steam injection (143° C./4 sec) followed by homogenization (40/10 bar at 75° C.), cooling down to 4° C. and filling. The sweet and salty cream could be foamed or whipped to an overrun of 100-160%, and layered on cold or hot tea. It was stable on the tea for about 15-20 minutes.

The invention claimed is:

1. A foamable or whippable food composition, comprising at least 12 wt. % fat, and further comprising protein, water, citric acid esters of mono- and/or diglycerides (CITREM) of one or more fatty acids comprising an unsaturated acyl chain, and lactic acid esters of mono- and diglycerides of one or more fatty acids (LACTEM),
wherein a total content of fat, protein, citric acid esters, and lactic acid esters is at least 15 wt. % of the composition, and
wherein 50-100 wt. % of the protein is milk protein.

2. The composition according to claim 1, wherein the total content of the CITREM is in the range of 0.05-0.5 wt. %.

3. The composition according to claim 1, wherein the total content of the CITREM is in the range of 0.10-0.20 wt. %.

4. The composition according to claim 1, wherein the total content of the LACTEM is in the range of 0.2-1.5 wt. %.

5. The composition according to claim 1, wherein the total content of the LACTEM is in the range of 0.5-1.5 wt. %.

6. The composition according to claim 1, wherein the CITREM have an iodine value in the range of 25-125.

7. The composition according to claim 1, wherein the total content of fat is in the range of 15-40 wt. %.

8. The composition according to claim 1, wherein 20-100 wt. % of the fat is milk fat.

9. The composition according to claim 1, wherein 50-100 wt. % of the fat is vegetable fat.

10. The composition according to claim 1, having a protein content of 0.5-6 wt. %.

11. The composition according to claim 1, having a protein content of 0.8-4 wt. %.

12. The composition according to claim 1, comprising a lactic acid ester of a monoglyceride comprising one saturated acyl chain and/or a lactic acid ester of a diglyceride comprising two saturated acyl chains.

13. The composition according to claim 1, comprising a lactic acid ester, wherein the acyl chain is a saturated C16-C18 acyl chain.

14. The composition according to claim 1, further comprising an emulsifier, which is a mono/diglyceride of a saturated fatty acid.

15. The composition according to claim 14, comprising 0.05-0.5 wt. % of the emulsifier.

16. The composition according to claim 1, in the form of a cream.

17. A foamed or whipped food composition, comprising at least 12 wt. % fat, and further comprising protein, water, citric acid esters of mono- and diglycerides (CITREM) of one or more fatty acids comprising an unsaturated acyl chain, and lactic acid esters of mono- and diglyceride (LACTEM),
wherein a total content of fat, protein, CITREM, and LACTEM is at least 15 wt. % of the composition, and
wherein 50-100 wt. % of the protein is milk protein.

18. The composition according to claim 17, having an overrun of at least 250%.

19. A foamable or whippable food composition, comprising at least 12 wt. % fat, and further comprising protein, water, citric acid esters of mono- and/or diglycerides (CITREM) of one or more fatty acids comprising an unsaturated acyl chain, and lactic acid esters of mono- and diglycerides of one or more fatty acids (LACTEM),
wherein a total content of fat, protein, citric acid esters, and lactic acid esters is at least 15 wt. % of the composition, and
wherein the composition has a protein content of 0.8-4 wt. %.

20. The composition according to claim 19, wherein the total content of the CITREM is in the range of 0.05-0.5 wt. %.

21. The composition according to claim 19, wherein the total content of the LACTEM is in the range of 0.2-1.5 wt. %.

22. A foamed or whipped food composition, comprising at least 12 wt. % fat, and further comprising protein, water, citric acid esters of mono- and diglycerides (CITREM) of one or more fatty acids comprising an unsaturated acyl chain, and lactic acid esters of mono- and diglyceride (LACTEM),
wherein a total content of fat, protein, CITREM, and LACTEM is at least 15 wt. % of the composition, and
wherein the composition has a protein content of 0.8-4 wt. %.

* * * * *